US012603443B2

(12) United States Patent
Koshino

(10) Patent No.: US 12,603,443 B2
(45) Date of Patent: Apr. 14, 2026

(54) OPTIMAL PHASE CONDITION DETERMINATION METHOD, ANTENNA MODULE, AND COMMUNICATION SYSTEM

(71) Applicant: Murata Manufacturing Co., Ltd., Nagaokakyo (JP)

(72) Inventor: Kouichi Koshino, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 119 days.

(21) Appl. No.: 18/611,769

(22) Filed: Mar. 21, 2024

(65) Prior Publication Data
US 2024/0235062 A1 Jul. 11, 2024

Related U.S. Application Data

(63) Continuation of application No. PCT/JP2022/035209, filed on Sep. 21, 2022.

(30) Foreign Application Priority Data

Oct. 11, 2021 (JP) ................................. 2021-166943

(51) Int. Cl.
| *H01Q 21/24* | (2006.01) |
| *H04B 7/06* | (2006.01) |
| *H04B 7/10* | (2017.01) |

(52) U.S. Cl.
CPC ......... *H01Q 21/245* (2013.01); *H04B 7/0682* (2013.01); *H04B 7/10* (2013.01)

(58) Field of Classification Search
CPC ........ H01Q 21/245; H01Q 1/24; H01Q 21/06; H04B 7/0682; H04B 7/10
See application file for complete search history.

(56) References Cited

U.S. PATENT DOCUMENTS

| 6,320,542 B1 * | 11/2001 | Yamamoto | ............. H01Q 21/24 |
| | | | 343/824 |
| 2022/0052459 A1 * | 2/2022 | Ado | ........................ H01Q 19/18 |

FOREIGN PATENT DOCUMENTS

| JP | S62-6502 | A | 1/1987 |
| JP | H03-151703 | A | 6/1991 |
| JP | H04-297107 | A | 10/1992 |
| JP | H07-106847 | A | 4/1995 |
| JP | 2745844 | B2 | 4/1998 |
| JP | 3082226 | B2 | 8/2000 |
| JP | 2002-185237 | A | 6/2002 |

(Continued)

OTHER PUBLICATIONS

International Search Report and Written Opinion mailed on Nov. 15, 2022, received for PCT Application PCT/JP2022/035209, filed on Sep. 21, 2022, 09 pages including English Translation.

*Primary Examiner* — Jean B Corrielus
(74) *Attorney, Agent, or Firm* — XSENSUS LLP

(57) ABSTRACT

A short-axis intensity is obtained under a plurality of phase conditions including different phase conditions of a high-frequency signal supplied to a plurality of antenna devices included in an array antenna. The short-axis intensity is a maximum value of a short-axis direction component of an electric field vector of a composite wave of radio waves radiated in a first direction from the respective antenna devices. An optimal phase condition of the high-frequency signal supplied to the plurality of antenna devices is determined in a manner such that the short-axis intensity of the composite wave is maximized.

18 Claims, 9 Drawing Sheets

(56)          References Cited

FOREIGN PATENT DOCUMENTS

JP          2012-151671  A      8/2012
JP          2014-027500  A      2/2014

* cited by examiner

| PHASE CONDITION | DIRECTION | OPTIMAL PHASE CONDITION |
|---|---|---|
| | $\theta, \varphi$ | $\{(onoff, \delta),(onoff, \delta),(onoff, \delta), \cdots (onoff, \delta)\}$ |
| Phc0 | $\theta=0°, \varphi=0°$ | $\{(on, 0°), (off, 0°),(on, 90°), \cdots (on, 180°)\}$ |
| Phc1 | $\theta=30°, \varphi=0°$ | $\{(on, 0°), (on, 0°),(on, 180°), \cdots (on, 270°)\}$ |
| Phc2 | $\cdots$ | $\cdots$ |
| Phc3 | $\cdots$ | $\cdots$ |

Emi3<E1<Emi2

E1<Emj2<Emj3

FIRST EXAMPLE (SHORT-AXIS INTENSITY MAXIMIZED)
REFERENCE     EXAMPLE     (MAIN     POLARIZATION COMPONENT MAXIMIZED)

OPTIMAL PHASE CONDITION DETERMINATION METHOD, ANTENNA MODULE, AND COMMUNICATION SYSTEM

CROSS-REFERENCE TO RELATED APPLICATIONS

This is a continuation application of PCT/JP2022/035209, filed on Sep. 21, 2022, designating the United States of America, which is based on and claims priority to Japanese Patent Application No. JP 2021-166943 filed on Oct. 11, 2021. The entire contents of the above-identified applications, including the specifications, drawings and claims, are incorporated herein by reference in their entirety.

TECHNICAL FIELD

The present disclosure relates to a method for determining an optimal phase condition of a high-frequency signal supplied to a plurality of antenna devices included in an array antenna, and an antenna module and a communication system which utilize the method.

BACKGROUND ART

Stable communication is required between an antenna which transmits and receives a circularly polarized wave and an antenna which transmits and receives a linearly polarized wave. In many cases, a radio wave radiated from an antenna for a circularly polarized wave is actually an elliptically polarized wave. Assuming a reception antenna for a linearly polarized wave receives an elliptically polarized wave, a reception level varies depending on a relationship between a long-axis direction of the elliptically polarized wave and a vibration direction of the linearly polarized wave of the reception antenna. The reception level is maximized assuming the long-axis direction of the elliptically polarized wave and the vibration direction of the linearly polarized wave of the reception antenna match one another. Conversely, the reception level is minimized assuming a short-axis direction of the elliptically polarized wave and the vibration direction of the linearly polarized wave of the reception antenna match one another.

Improving an axial ratio of the circularly polarized wave is preferable for stable communication regardless of the positional relationship between the long-axis direction of the elliptically polarized wave and the vibration direction of the linearly polarized wave of the reception antenna. Here, the "axial ratio" is defined as a ratio (Emi/Emj) of a maximum value Emj of a long-axis component to a maximum value Emi of a short-axis component of an electric field vector of the elliptically polarized wave. Completely circularly polarized wave has an axial ratio of 1, and the elliptically polarized wave has an axial ratio larger than 1.

Patent Document 1 described below discloses a sequential array antenna which can improve an axial ratio of a circularly polarized wave. This sequential array antenna includes a plurality of subarrays. Each subarray includes a plurality of circular polarization antenna devices. The plurality of antenna devices included in each subarray is made sequential by postures of the antenna devices being shifted with respect to one another in a rotational direction. Moreover, the plurality of subarrays is also made sequential. In such an arrangement, even assuming the axial ratio has variation between the respective antenna devices, the variation in the axial ratio has smaller influence as a whole.

CITATION LIST

Patent Document

Patent Document 1: Japanese Unexamined Patent Application Publication No. 3-151703

SUMMARY OF DISCLOSURE

Technical Problem

In some cases, not all the circular polarization antenna devices need to be operated depending on a communication distance and a communication speed (bit rate). In the conventional sequential array antenna, there is a case in which a suitable axial ratio cannot be maintained assuming one or some of the circular polarization antenna devices operate. Assuming the suitable axial ratio is not maintained, communication stability cannot sufficiently be improved. Improvement in the communication stability is desired also in the case in which one or some of the circular polarization antenna devices operate.

One object of the present disclosure is to provide an optimal phase condition determination method which enables stable communication in both of a case in which all of circular polarization antenna devices operate and a case in which one or some of the circular polarization antenna devices operate. Another object of the present disclosure is to provide an antenna module and a communication system to which the optimal phase condition determination method is applied.

Solution to Problem

According to an aspect of the present disclosure, there is provided an optimal phase condition determination method including:

obtaining a short-axis intensity under a plurality of phase conditions including different phase conditions of a high-frequency signal supplied to a plurality of antenna devices included in an array antenna, the short-axis intensity being a maximum value of a short-axis direction component of an electric field vector of a composite wave of radio waves radiated in a first direction from the respective antenna devices; and determining an optimal phase condition of the high-frequency signal supplied to the plurality of antenna devices in a manner such that the short-axis intensity of the composite wave is maximized.

According to another aspect of the present disclosure, there is provided an optimal phase condition determination method including:

obtaining a long-axis intensity under a plurality of phase conditions including different phase conditions of a high-frequency signal supplied to a plurality of antenna devices included in an array antenna, the long-axis intensity being a maximum value of a long-axis direction component of an electric field vector of a composite wave of radio waves radiated in a first direction from the respective antenna devices; and determining an optimal phase condition of the high-frequency signal supplied to the plurality of antenna devices in a manner such that the long-axis intensity of the composite wave is maximized.

According to still another aspect of the present disclosure, there is provided an antenna module including:

an array antenna including a plurality of antenna devices configured to transmit and receive a circularly polarized wave;

a high-frequency circuit configured to adjust phases between the antenna devices and supply a high-frequency signal to each of the plurality of antenna devices; and a control unit storing an optimal phase condition list in which a phase condition of the high-frequency signal supplied to the plurality of antenna devices is associated with each of multiple directions seen from the array antenna, and configured to control, in accordance with a direction in which a radio wave is to be transmitted, the high-frequency circuit to operate under a phase condition associated with the direction, in which the phase condition included in the optimal phase condition list is determined in a manner such that a short-axis intensity is maximized, the short-axis intensity being a maximum value of a short-axis direction component of an electric field vector of a composite wave of radio waves radiated in a direction associated with the phase condition from the plurality of antenna devices.

According to yet another aspect of the present disclosure, there is provided an antenna module including:

an array antenna including a plurality of antenna devices configured to transmit and receive a linearly polarized wave;

a high-frequency circuit configured to adjust phases between the antenna devices and supply a high-frequency signal to each of the plurality of antenna devices; and a control unit storing an optimal phase condition list in which a phase condition of the high-frequency signal supplied to the plurality of antenna devices is associated with each of multiple directions seen from the array antenna, and configured to control, in accordance with a direction in which a radio wave is to be transmitted, the high-frequency circuit to operate under a phase condition associated with the direction, in which the phase condition included in the optimal phase condition list is determined in a manner such that a long-axis intensity is maximized, the long-axis intensity being a maximum value of a long-axis direction component of an electric field vector of a composite wave of radio waves radiated in a direction associated with the phase condition from the plurality of antenna devices.

According to yet another aspect of the present disclosure, there is provided a communication system including:

a first antenna module; and a second antenna module configured to communicate with the first antenna module by transmitting and receiving a linearly polarized wave, in which the first antenna module includes a first array antenna including a plurality of first antenna devices configured to transmit and receive a circularly polarized wave, a first high-frequency circuit configured to adjust phases between the first antenna devices and supply a high-frequency signal to each of the plurality of first antenna devices, and a first control unit storing, to be associated with each of multiple directions seen from the first array antenna, a phase condition of the high-frequency signal supplied to the plurality of first antenna devices, and configured to control, in accordance with a direction in which a radio wave is to be transmitted, the first high-frequency circuit to operate under a phase condition associated with the direction, the phase condition stored in the first control unit is determined in a manner such that a short-axis intensity is maximized, the short-axis intensity being a maximum value of a short-axis direction component of an electric field vector of a composite wave of radio waves radiated in a direction associated with the phase condition from the plurality of first antenna devices, the second antenna module includes a second antenna device configured to transmit and receive a linearly polarized wave, and assuming the second antenna module receives a radio wave from the first antenna module, the second antenna module transmits a measurement value of a reception intensity to the first antenna module, and the first control unit operates the first high-frequency circuit under a plurality of phase conditions; determines, as an optimal phase condition, a phase condition under which the measurement value of the reception intensity, the measurement value being received from the second antenna module, becomes a highest; and operates the first high-frequency circuit under the optimal phase condition to communicate with the second antenna module.

According to yet another aspect of the present disclosure, there is provided a communication system including:

a first antenna module configured to transmit and receive a circularly polarized wave; and a second antenna module configured to communicate with the first antenna module, in which the second antenna module includes a second array antenna including a plurality of second antenna devices configured to transmit and receive a linearly polarized wave, a second high-frequency circuit configured to adjust phases between the second antenna devices and supply a high-frequency signal to each of the plurality of second antenna devices, and a second control unit storing, to be associated with each of multiple directions seen from the second array antenna, a phase condition of the high-frequency signal supplied to the plurality of second antenna devices, and configured to control, in accordance with a direction in which a radio wave is to be transmitted, the second high-frequency circuit to operate under a phase condition associated with the direction, the phase condition stored in the second control unit is determined in a manner such that a long-axis intensity is maximized, the long-axis intensity being a maximum value of a long-axis direction component of an electric field vector of a composite wave of radio waves radiated in a direction associated with the phase condition from the plurality of second antenna devices, the first antenna module includes a first antenna device configured to transmit and receive a circularly polarized wave, and assuming the first antenna module receives a radio wave from the second antenna module, the first antenna module transmits a measurement value of a reception intensity to the second antenna module, and the second control unit operates the second high-frequency circuit under a plurality of phase conditions; determines, as an optimal phase condition, a phase condition under which the measurement value of the reception intensity, the measurement value being received from the first antenna module, becomes a highest; and operates the second high-frequency circuit under the optimal phase condition to communicate with the first antenna module.

Advantageous Effects of Disclosure

Assuming the short-axis intensity of the composite wave is maximized, the elliptically polarized wave can stably be received regardless of a relative positional relationship between an inclination direction of the reaching elliptically polarized wave and the vibration direction of the linearly-polarized-wave reception antenna. Assuming the long-axis intensity of the composite wave is maximized, the linearly polarized wave can stably be received regardless of a positional relationship between the polarization direction of the reaching linearly polarized wave and the circularly-polarized-wave reception antenna.

BRIEF DESCRIPTION OF DRAWINGS

FIGS. 3A and 3B are schematic views illustrating two polarization states of a composite wave radiated from the first array antenna.

DESCRIPTION OF EMBODIMENTS

Before description of examples of the disclosure of the present application, an optimal phase condition determination method according to a reference example proposed by the inventors of the present application is described with reference to drawings of FIGS. 1A to 3B. Note that FIGS. 1A, 1B, 3A, and 3B will also be referred to in description of an optimal phase condition determination method according to the examples.

REFERENCE EXAMPLE

Figure 1A:
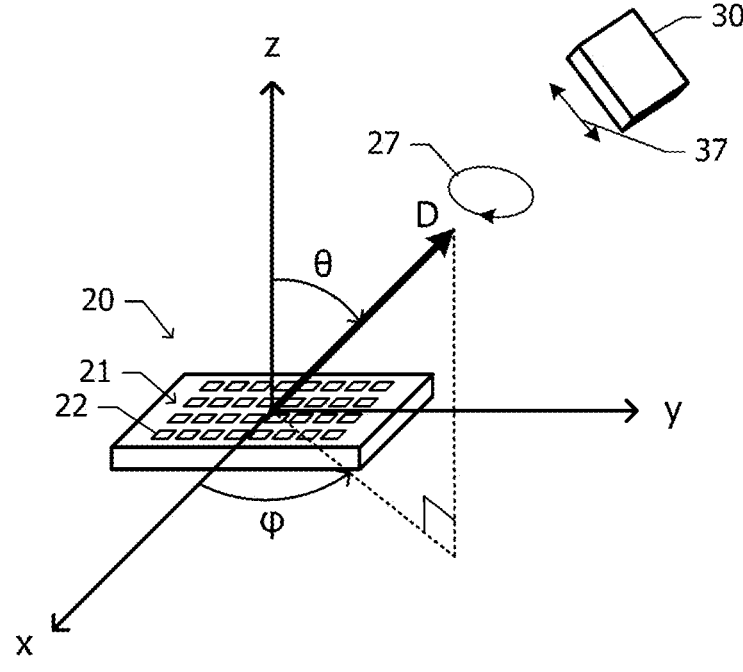
FIG. 1A is a schematic view illustrating a positional relationship between a first antenna module and a second antenna module and a definition of a coordinate system.

FIG. 1A is a schematic view illustrating a positional relationship between a first antenna module 20 and a second antenna module 30 and a definition of a coordinate system. An xyz orthogonal coordinate system is defined such that a boresight direction of the first antenna module 20 is a positive direction of a z-axis. A polar angle is represented as $\theta$ and an azimuth is represented as $\varphi$ in an arbitrary direction. For example, the first antenna module 20 is equipped with a first array antenna 21 including a plurality of antenna devices 22 arranged on a plane. Each of the multiple antenna devices 22 is designed to transmit and receive a circularly polarized wave 27. A composite wave of radio waves radiated from the plurality of antenna devices 22 generally becomes an elliptically polarized wave. This is because the composite wave includes a main polarization component and a cross polarization component. The second antenna module 30 receives and transmits a linearly polarized wave 37. The expression of "receive and transmit a circularly polarized wave" as used herein includes a case of transmission and reception of a strictly circularly polarized wave, as well as a case of transmission and reception of an elliptically polarized wave.

A condition to drive the first antenna module 20 includes information to specify ON/OFF of each antenna device 22, and a phase of a high-frequency signal to be supplied to each antenna device 22 which is turned ON. Here, "ON" means to supply a high-frequency signal to the antenna device, and "OFF" means to stop supplying of a high-frequency signal to the antenna device. The condition including ON/OFF of the antenna device 22 and the phase of the high-frequency signal to be supplied to the antenna device 22 is referred to as a phase condition to drive the plurality of antenna devices 22.

A specific direction seen from the first antenna module 20 is referred to as a first direction D. In this reference example, an optimal phase condition is determined in a manner such that a main polarization component of a composite wave which goes from the first antenna module 20 toward the first direction D is maximized. Then, a high-frequency signal is supplied to the plurality of antenna devices 22 under the optimal phase condition.

The optimal phase condition changes as the first direction D changes. Herein, a processing to identify the optimal phase condition in the first direction D is referred to as a "phase condition search processing". For example, in a case in which the antenna device 22 includes thirty-two antenna devices 22 and a phase of a high-frequency signal supplied to each antenna device 22 is shifted in 90° increments using a phase shifter, there are $(4+1)^{32}$ of different phase conditions. Here, "4" indicates that the antenna device 22 is ON and takes any of four different states in which the phase is 0°, 90°, 180°, and 270°. "1" indicates that the antenna device 22 takes the OFF state. Note that the increment of the phase may be other than 90°. The phase condition search processing is a processing to determine one optimal phase condition among the $(4+1)^{32}$ of different phase conditions.

The optimal phase condition varies in accordance with the direction seen from the first array antenna 21.

Figure 1B:
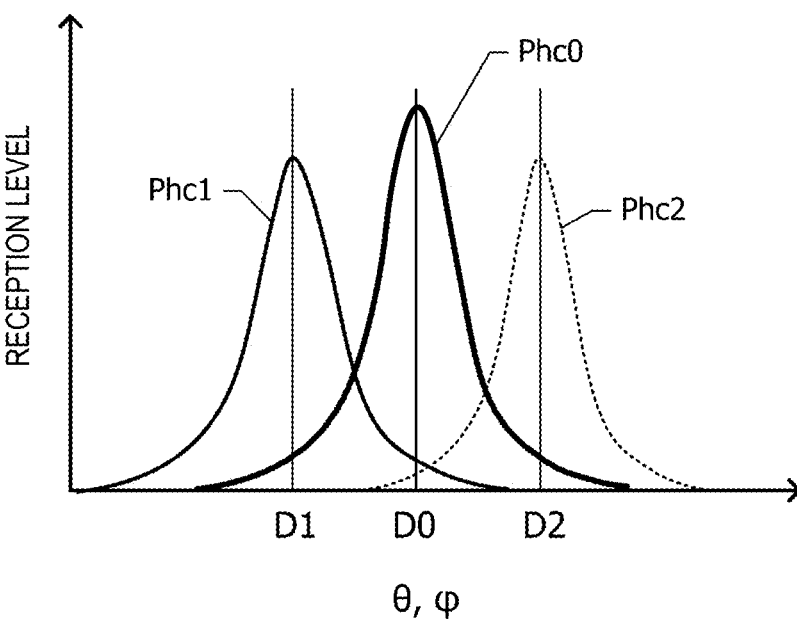
FIG. 1B is a graph showing one example of a relationship between a direction from a first array antenna and a reception level at the second antenna module.

FIG. 1B is a graph showing one example of a relationship between a direction in which the second antenna module 30 is seen from the first array antenna 21 and a reception level at the second antenna module 30. A horizontal axis indicates the direction in which the second antenna module 30 is seen from the first antenna module 20. A vertical axis indicates the reception level. Note that although the direction seen from the first antenna module 20 is defined two-dimensionally by the polar angle θ and the azimuth φ, in FIG. 1B, the direction is represented one-dimensionally. For example, assuming the second antenna module 30 is disposed at a position in a direction D0, a phase condition Phc0 is optimal. Assuming the second antenna module 30 is disposed at positions in directions D1 and D2, phase conditions Phc1 and Phc2 are optimal, respectively.

Figure 2:
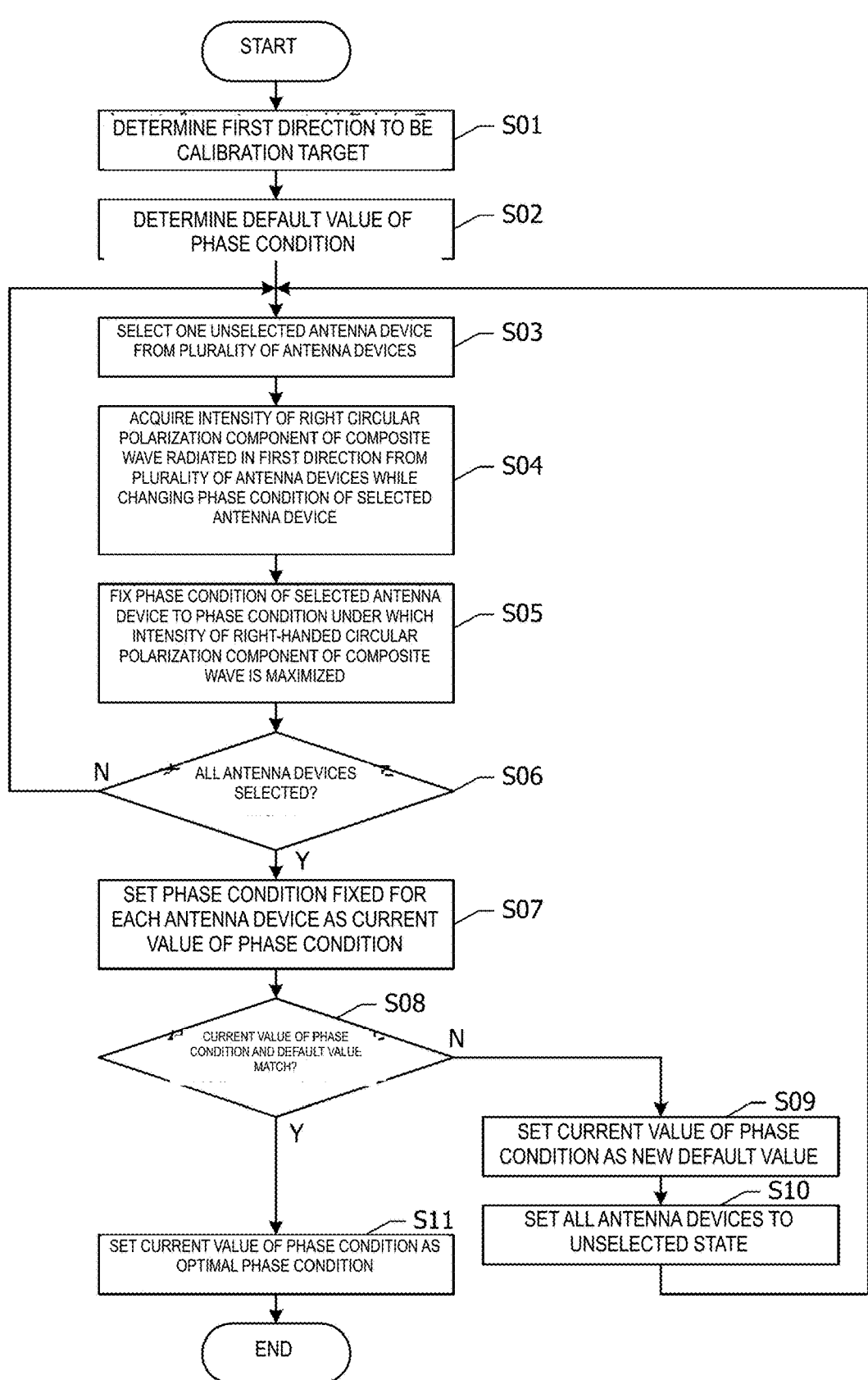
FIG. 2 is a flowchart presenting a procedure of a phase condition determination processing adopted in an optimal phase condition determination method according to a reference example.

FIG. 2 is a flowchart presenting a procedure of the optimal phase condition determination method (phase condition search processing) according to the reference example. One example presents a case in which the main polarized wave is a right-handed circularly polarized wave. In this case, a cross polarized wave having an orthogonal relationship with respect to the main polarized wave is a left-handed circularly polarized wave. Being "orthogonal" in terms of the polarized wave is described below.

Time variations of electric field vectors of two polarized waves at a certain position are represented as A(t) and B(t) by complex number expression. Assuming the following equation is satisfied, the two polarized waves are orthogonal to one another between times $t_0$ and $t_1$.

[Math. 1]

$$\int_{t_0}^{t_1} A^*(t)B(t)dt = 0 \tag{1}$$

Here, A*(t) indicates a complex conjugate of the electric field vector A(t). A polarization state at a certain point and a polarization state at a point on the opposite side in Poincare sphere are orthogonal to one another. For example, a vertically polarized wave and a horizontally polarized wave are orthogonal to one another, and a right-handed circularly polarized wave and a left-handed circularly polarized wave are orthogonal to one another.

First, the first direction D (FIG. 1A) to be a calibration target is determined (Step S01). Next, a default value of the phase condition of the first array antenna 21 is determined (Step S02). Any one of the antenna devices 22 is switched from OFF to ON, and by adjustment of its phase, intensity of the main polarization component of the composite wave can be increased. Therefore, in this reference example, considering the OFF state of the antenna device 22 is not necessary. Each antenna device 22 may take four states in which the phase is 0°, 90°, 180°, and 270°.

As the default value of the phase condition, a state in which phase conditions of all the antenna devices 22 are 0° is adopted. Here, the "phase condition of the antenna device 22" means the phase of the high-frequency signal supplied to the antenna device 22. Assuming a phase condition of an ith antenna device 22 is represented as Φi, a default value of the phase condition is represented by the following equation.

[Math. 2]

$$\Phi_i = 0(i = 1, 2, 3 \ldots N) \tag{2}$$

Here, N is the number of antenna devices 22.

Next, one unselected antenna device 22 is selected from the plurality of antenna devices 22 (Step S03). Since all the antenna devices 22 are in the unselected state at first, for example, a first one of the antenna devices 22 is selected. The antenna device 22 once selected becomes a selected state.

Next, while the phase condition of the selected antenna device 22 is changed, intensity of a right-handed circular polarization component of a composite wave radiated in the first direction D is acquired under each phase condition (Step S04). For example, a circularly-polarized-wave reception antenna is disposed in the first direction D, and receives the composite wave radiated from the first array antenna 21 while being set to a right-handed circularly polarized wave reception state. Therefore, the intensity of the right-handed circular polarization component can be measured.

The phase condition of the selected antenna device 22 is fixed to a phase condition under which the intensity of the right-handed circular polarization component becomes the maximum (Step S05). The procedure from Step S03 to Step S05 is repeated until all the antenna devices 22 become the selected state (Step S06). For example, a first, a second, a third, . . . and Nth antenna devices 22 are selected in order.

Once all the antenna devices 22 become the selected state, the phase conditions fixed for the respective antenna devices 22 are set as a current value of the phase condition (Step S07). Whether the current value of the phase condition matches the default value is determined (Step S08). Assuming the current value of the phase condition and the default value differ from one another, that is, at Step S05, the phase condition of at least one antenna device 22 is changed, the current value of the phase condition is set as a new default value (Step S09).

All the antenna devices 22 are set to an unselected state (Step S10), and the procedure from Step S03 is repeated. That is, the procedure from Step S03 to Step S10 is repeated until the current value of the phase condition and the default value match one another. At Step S08, assuming the current value of the phase condition matches the default value, the current value of the phase condition is set as the optimal phase condition (Step S11).

By the first array antenna 21 being operated under the optimal phase condition determined through the phase condition search processing according to the reference example, the right-handed circular polarization component of the radio wave radiated in the first direction D (FIG. 1A) can be maximized. Note that "maximized" as used herein means being the largest among the plurality of evaluated phase conditions. The right-handed circular polarization component may be larger under an unevaluated phase condition, for example, assuming the phase is changed by an angle smaller than the phase increment used upon the evaluation. Maximizing the right-handed circular polarization component of the radio wave radiated in the first direction D corresponds to making phases of the right-handed circular polarization components of the plurality of antenna devices 22 in-phase with one another.

Figures 3A, 3B:
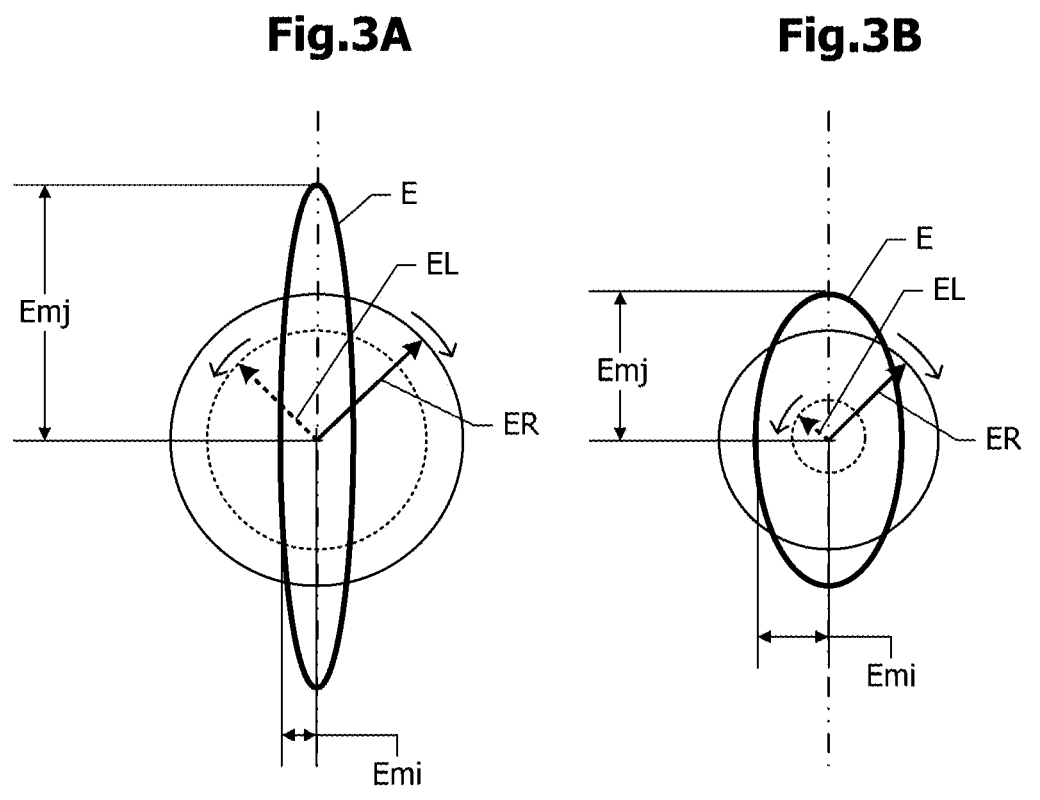

Next, a problem of the phase condition search processing according to the reference example is described with reference to FIGS. 3A and 3B. FIGS. 3A and 3B are schematic views illustrating an example of two polarization states of the composite wave radiated from the first array antenna 21. In FIGS. 3A and 3B, as one example, instantaneous value directions of a right-handed circular polarization component ER and a left-handed circular polarization component EL match one another in an up direction and a down direction. A trajectory E of a tip end of a composite vector of the right-handed circular polarization component ER and the left-handed circular polarization component EL of the electric field vector shows an ellipse elongated in a vertical direction.

The right-handed circular polarization component ER of the polarized wave illustrated in FIG. 3A is larger than the right-handed circular polarization component ER of the polarized wave illustrated in FIG. 3B. Therefore, assuming the optimal phase condition is determined through the phase condition search processing (FIG. 2) according to the reference example, the phase condition which results in the polarization state illustrated in not FIG. 3B but FIG. 3A is determined as the optimal phase condition.

The left-handed circular polarization component EL of the polarization wave illustrated in FIG. 3A is larger than the left-handed circular polarization component EL of the polarized wave illustrated in FIG. 3B. A difference between the right-handed circular polarization component ER and the left-handed circular polarization component EL is smaller in the polarized wave illustrated in FIG. 3A than in the polarized wave illustrated in FIG. 3B. Therefore, a maximum value of a short-axis direction component (hereinafter, referred to as a short-axis intensity Emi) of an electric field vector of an elliptically polarized wave is smaller In the polarized wave illustrated in FIG. 3A than in the polarized wave illustrated in FIG. 3B. Note that a maximum value of a long-axis direction component (hereinafter, referred to as a long-axis intensity Emj) of the electric field vector of the elliptically polarized wave is larger in the polarized wave illustrated in FIG. 3A than in the polarized wave illustrated in FIG. 3B.

Assuming a linear polarization antenna having an electric field vibration direction in parallel to the short-axis direction receives the elliptically polarized waves illustrated in FIGS. 3A and 3B, a reception level of the elliptically polarized wave illustrated in FIG. 3A is lower than a reception level of the elliptically polarized wave illustrated in FIG. 3B. In other words, the reception level largely varies depending on the electric field vibration direction of the reception antenna. Assuming the optimal phase condition is determined through the phase condition search processing according to the reference example, the composite wave becomes the elliptically polarized wave illustrated in FIG. 3A. Therefore, the reception level is likely to be unstable.

In the case in which the optimal phase condition is determined by application of the phase condition search processing according to the reference example, the short-axis intensity of the elliptically polarized wave can be maximized by any of the following conditions being satisfied.

First, in the polarized wave radiated in the first direction D from each antenna device 22, the cross polarization component is negligibly small relatively to the main polarization component. Second, assuming the plurality of antenna devices 22 is classified into a plurality of pairs, inclination angles of ellipses of the elliptically polarized waves radiated in the first direction D by the antenna devices 22 of each pair are orthogonal to one another, and the phase condition in which the main polarization component is maximized and the phase condition to cancel the cross polarization component match one another.

In order to satisfy any of the two conditions described above in a wide range of various first directions D, the antenna needs to be manufactured highly accurately, which is not realistic.

First Example

Next, an optimal phase condition determination method according to a first example is described with reference to drawings of FIGS. 4 to 7. Note that FIG. 1A is referred to as necessary. In terms of a configuration similar to the above-described reference example, redundant description may be omitted. In the reference example, the phase condition is adjusted in a manner such that the intensity of the right-handed circular polarization component of the composite wave is maximized (Step S05 in FIG. 2). In this respect, in the first example, the phase condition is adjusted in a manner such that the short-axis intensity of the composite wave is maximized.

Figure 4:
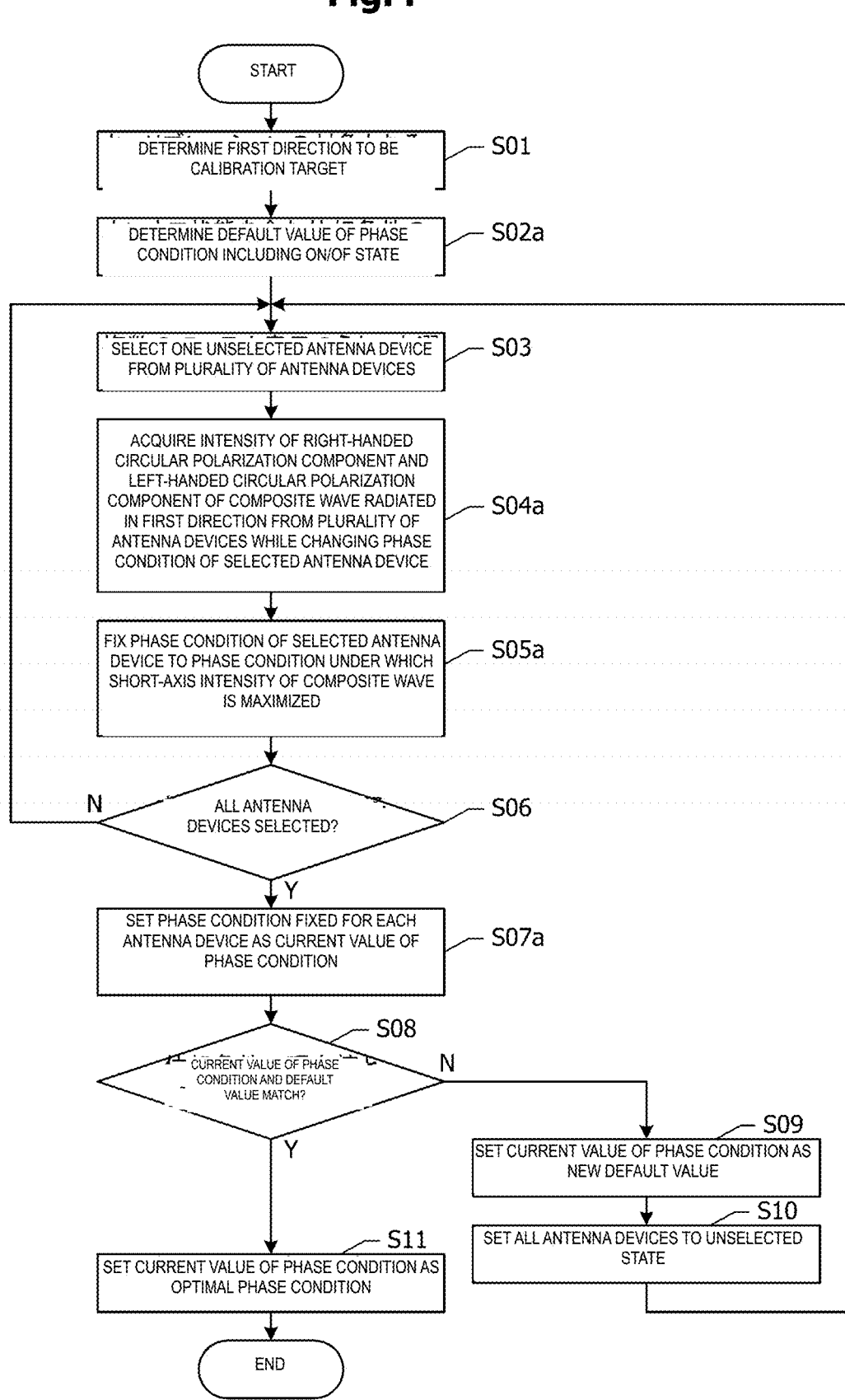
FIG. 4 is a flowchart presenting a procedure of a phase condition determination processing adopted in an optimal phase condition determination method according to a first example.

FIG. 4 is a flowchart presenting a procedure of the optimal phase condition determination method (phase condition search processing) according to the first example. First, similarly to the reference example, the first direction D (FIG. 1A) to be a calibration target is determined (Step S01). Next, a default value of the phase condition including an ON/OFF state is determined (Step S02a). Although, in the reference example, making the antenna device 22 OFF is not considered, in the first example, the antenna device 22 may be made OFF. This is because even assuming the antenna device 22 is made ON and the phase is somehow adjusted, the short-axis intensity of the composite wave may be reduced. In such a case, the antenna device 22 is made OFF.

In the first example, each antenna device 22 is set to any of five states where the phase is 0°, 90°, 180°, 270°, and OFF. As the default value of the phase condition, for example, all the antenna devices 22 are set to OFF.

Similarly to the reference example, one antenna device 22 is selected from the unselected antenna devices 22 (Step S03). The phase condition (including the OFF state) of the selected antenna device 22 is changed, and intensity of each of the right-handed circular polarization component and the left-handed circular polarization component of the composite wave radiated in the first direction D from the first array antenna 21 (FIG. 1A) is acquired (Step S04a). For example, a circularly-polarized-wave reception antenna is disposed in the first direction D, and receives the composite wave while being set to a right-handed circularly polarized wave reception state. Then, the circularly-polarized-wave reception antenna receives the composite wave by being switched to a left-handed circularly polarized wave reception state. Therefore, the intensity of the right-handed circular polarization component and the intensity of the left-handed circular polarization component can be measured.

Next, the phase condition of the selected antenna device 22 is fixed to a condition under which the short-axis intensity of the composite wave becomes the maximum (Step S05a). Thus, the phase condition of the selected antenna device 22 is fixed to any of OFF, 0°, 90°, 180°, and 270° The ""short-axis intensity becomes the maximum"" as used herein means becoming the largest among the plurality of evaluated phase conditions. The short-axis intensity may be larger under an unevaluated phase condition, for example, assuming the phase increment is smaller than 90°. Herein, ""'maximizing the short-axis intensity'"" means making the short-axis intensity largest among the plurality of evaluated phase conditions.

A method for obtaining the short-axis intensity of the composite wave is described below. The intensity of the right-handed circular polarization component of the composite wave is represented as $A_{sum,R}$ [dBm], and the intensity of the left-handed circular polarization component is represented as $A_{sum,L}$ [dBm]. Here, square brackets [ ] present a unit. A unit of the intensity of the right-handed circular polarization component and a unit of the intensity of the left-handed circular polarization component are converted into $(mW)^{1/2}$ by using the following conversion equation.

[Math. 3]

$$A\left[\sqrt{mW}\right] = 10^{\frac{A[dBm]}{20}} \qquad (3)$$

A short-axis intensity $A_{sum,mi}$ of the composite wave can be calculated by using the following equation.

[Math. 4]

$$A_{sum,mi} = \frac{A_{sum,R}\left[\sqrt{mW}\right] - A_{sum,L}\left[\sqrt{mW}\right]}{\sqrt{2}} \qquad (4)$$

After the phase condition of the selected antenna device 22 is fixed to the phase condition under which the short-axis intensity of the composite wave becomes the maximum (Step S05a), the procedure from Step S03 to Step S05a is repeated until all the antenna devices 22 are selected (Step S06).

Once all the antenna devices 22 become the selected state, the phase conditions fixed for the respective antenna devices 22 are set as a current value of the phase condition (Step S07a). Whether the current value of the phase condition matches the default value is determined (Step S08). Assuming the current value of the phase condition does not match the default value, the current value of the phase condition is set as a new default value (Step S09). Then, all the antenna devices 22 are set to an unselected state (Step S10). The procedure from Step S03 to Step S10 is repeated until the current value of the phase condition and the default value match one another.

At Step S08, assuming the current value of the phase condition matches the default value, the current value of the phase condition is adopted as the optimal phase condition (Step S11).

By execution of the procedure presented in FIG. 4 while changing the first direction D as the calibration target, the optimal phase condition for each of the multiple first directions D is determined. Therefore, an optimal phase condition list is obtained, in which the optimal phase conditions to operate the first array antenna 21 are associated with the respective directions seen from the first array antenna 21 (FIG. 1).

Figure 5:
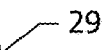
FIG. 5 is a table showing one example of an optimal phase condition list.

FIG. 5 is a table showing one example of an optimal phase condition list 29. For example, each of the multiple directions is identified by the polar angle θ and the azimuth φ. The optimal phase condition is associated with each direction. The optimal phase condition includes the ON/OFF state and the phase value set for each antenna device 22. In FIG. 5, each pair of round brackets in a pair of curly brackets indicates the phase condition of one antenna device 22. One pair of curly brackets indicates the optimal phase condition of the first array antenna 21 in the first direction D. The optimal phase condition list 29 includes a plurality of phase conditions Phc0, Phc1, Phc2, . . . .

Next, a beneficial effect of the first example is described with reference to FIGS. 3A, 3B, 6, and 7.

In the first example (FIG. 4), the optimal phase condition is determined in a manner such that the short-axis intensity of the composite wave becomes the maximum (Step S05a). The short-axis intensity Emi of the elliptically polarized wave illustrated in FIG. 3B is larger than the short-axis intensity Emi of the elliptically polarized wave illustrated in FIG. 3A. Therefore, assuming the first array antenna 21 is operated under the optimal phase condition obtained by execution of the phase condition determination processing adopted in the method according to the first example, a composite wave closer to the elliptically polarized wave illustrated in FIG. 3B than the elliptically polarized wave illustrated in FIG. 3A is obtained.

Assuming the linear polarization antenna receives the composite wave, a high reception level to some extent can be secured even under a worst condition where the electric field vibration direction of the linear polarization antenna is in parallel to the short-axis direction of the elliptically polarized wave. Therefore, stable communication is achievable.

Figure 6:
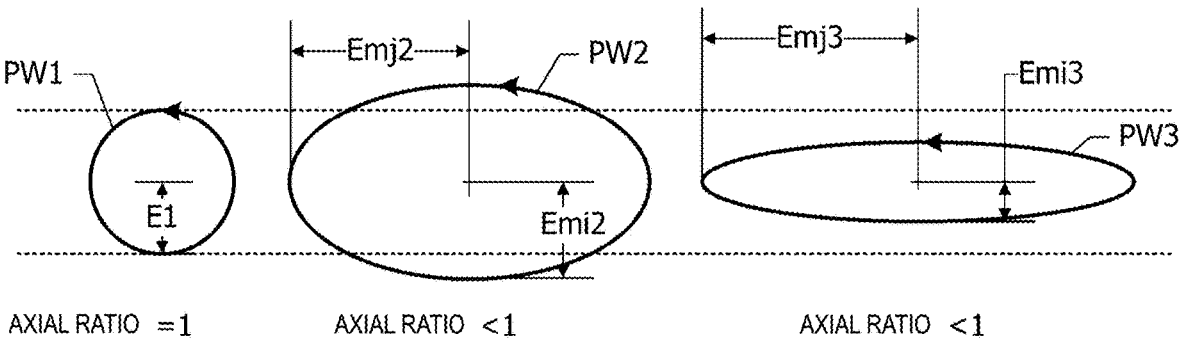
FIG. 6 is a schematic view illustrating a trajectory of an electric field vector of a circularly polarized wave and an elliptically polarized wave.

FIG. 6 is a schematic view illustrating a trajectory of an electric field vector of a circularly polarized wave and an elliptically polarized wave. A trajectory illustrated at a left side is a trajectory of a circularly polarized wave PW1, and an axial ratio thereof is 1. Trajectories illustrated at a middle and a right side are trajectories of elliptically polarized waves PW2 and PW3, respectively. Axial ratios of both of the elliptically polarized waves PW2 and PW3 are larger than 1. A short-axis intensity Emi2 of the elliptically polarized wave PW2 is larger than an intensity E1 of the circularly polarized wave PW1. A short-axis intensity Emi3 of the elliptically polarized wave PW3 is smaller than the intensity E1 of the circularly polarized wave PW1.

A case in which the phase condition is changed to realize the circularly polarized wave PW1 and the elliptically polarized waves PW2 and PW3 illustrated in FIG. 6 is discussed. For example, at least three types of linear polarization antennas with different polarization directions receive a composite wave, and a phase condition under which intensities of radio waves received by the at least three types of linear polarization antennas become equal to one another is obtained. Thereby, a composite wave close to the circularly polarized wave PW1 is realized. In the first example, the optimal phase condition is determined in a manner such that the short-axis intensity becomes the maximum. Therefore, assuming the first array antenna 21 (FIG. 1A) is operated under the optimal phase condition determined in the method according to the first example, the elliptically polarized wave PW2 is obtained. Thus, comparing to a case in which the linear polarization antenna receives the radio wave of the elliptically polarized wave PW3, stable communication is achievable.

Moreover, in the case in which the linear polarization antenna receives the elliptically polarized wave PW2 obtained in the method according to the first example, regardless of the electric field vibration direction of the linear polarization antenna, the reception level becomes higher than that in the case in which the circularly polarized wave PW1 is received. As described above, by execution of the phase condition determination processing adopted in the method according to the first example, assuming compared to a method of adjusting the first array antenna in such a manner as to make the axial ratio closer to 1, the reception level can be increased, and stable communication becomes achievable.

Figure 7:
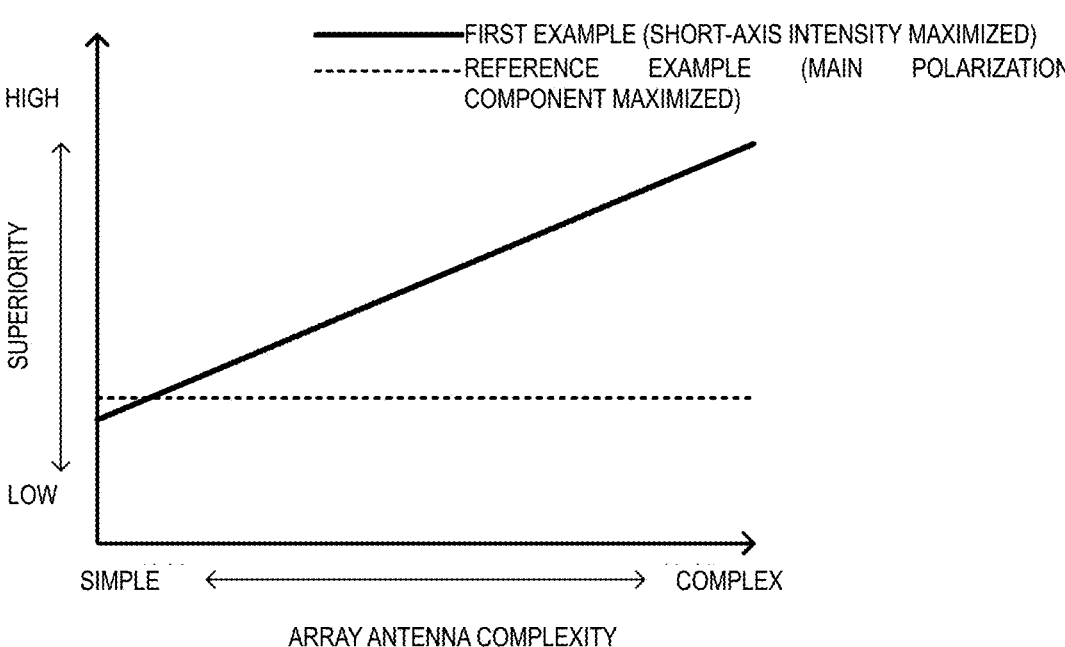
FIG. 7 is a graph showing a qualitative relationship between complexity and superiority of the array antenna.

FIG. 7 is a graph showing a qualitative relationship between complexity and superiority of the array antenna. A horizontal axis indicates complexity of the array antenna, and a vertical axis indicates superiority. The complexity of the array antenna includes the number of antenna devices included in the array antenna, complexity of a shape of the antenna device, and a size of a communication range to be covered. The complexity increases as the number of antenna devices increases. The complexity increases as the size of the range to be covered increases. A solid line in the graph illustrated in FIG. 7 indicates superiority of the method according to the first example, that is, the method in which the phase condition determination processing is performed in such a manner as to maximize the short-axis intensity. A broken line indicates superiority of the method according to the reference example (FIG. 2), that is, the method in which the phase condition determination processing is performed in such a manner as to maximize the intensity of the main polarization component.

As already been described in the reference example, in the case in which the condition under which the main polarization component is maximized substantially matches the condition under which the short-axis intensity of the elliptically polarized wave is maximized, the short-axis intensity can be made large even in the method according to the reference example. However, in order to satisfy this condition, manufacturing accuracy of the antenna needs to be improved.

In the phase condition determination processing adopted in the method according to the first example, the circularly-polarized-wave reception antenna needs to be switched in order to receive the two polarized waves, that is, the right-handed circularly polarized wave and the left-handed circularly polarized wave, at Step S04*a* (FIG. 4). Moreover, for example, since the two polarized waves need to be received, and the antenna device 22 selected at Step S03 (FIG. 4) needs be operated in each of the five states including the OFF state, time required for execution of the phase condition determination processing increases.

In a case in which the array antenna is simple and is manufactured highly accurately so that the condition under which the main polarization component is maximized and the condition under which the short-axis intensity of the elliptically polarized wave is maximized substantially match one another, the reference example is applicable, and thus the phase condition determination processing can be performed in a short period of time without switching of the reception antenna. Therefore, the reference example can be said to have superiority to the first example.

However, assuming the antenna is complex, it is difficult and unrealistic to manufacture the array antenna so that the condition under which the main polarization component is maximized and the condition under which the short-axis intensity of the elliptically polarized wave is maximized substantially match one another. In such a case, the first example has superiority to the reference example. Actually, in many cases, the first example has superiority to the reference example.

Next, a beneficial effect of the first example assuming compared to a comparative example different from the above reference example is described. In the reference example, the optimal phase condition is obtained while focusing on the main polarization component. However, in the comparative example described below, the optimal phase condition is obtained while focusing on the main polarization component as well as the cross polarization component.

The comparative example is described below. A difference between a gain of a main polarization component of a composite wave in the first direction D (FIG. 1A) assuming seen from the array antenna and a desired gain is represented as Gd. A gain of a cross polarization component of the composite wave in the first direction D (FIG. 1A) assuming seen from the array antenna is represented as Gc. The optimal phase condition is obtained in a manner such that a sum of a square of the difference Gd between the gain of the main polarization component and the desired gain and a square of the gain Gc of the cross polarization component becomes minimum. In this method, the phase condition is obtained where the gain of the main polarization component gets close to the desired gain and the gain Gc of the cross polarization component decreases.

In the comparative example, the obtained phase condition depends on the desired gain of the main polarization component. As one example, a gain corresponding to the intensity E1 of the circularly polarized wave PW1 illustrated at the left side in FIG. 6 is set as the desired gain, and the optimal phase condition is obtained in the method according to the comparative example. As a result, a composite wave close to the circularly polarized wave PW1 illustrated at the left side in FIG. 6 is realized. On the other hand, assuming the optimal phase condition is obtained under the condition where the short-axis intensity becomes the maximum like the first example, a composite wave like the elliptically polarized wave illustrated at the middle in FIG. 6 may be realized.

As described above, in the case in which the optimal phase condition is obtained in the method according to the comparative example, the short-axis intensity of composite wave is not necessarily maximized under the obtained phase condition. On the other hand, assuming the optimal phase condition is obtained in the method according to the first example, the short-axis intensity of composite wave can be maximized.

Next, an optimal phase condition determination method according to a first modification of the first example is described.

In the first example, at Step S04*a* (FIG. 4), the intensity of the right-handed circular polarization component and the intensity of the left-handed circular polarization component are measured by the plurality of antenna devices 22 of the first array antenna 21 (FIG. 1A) radiating the circularly polarized waves and the composite wave thereof being received. In this respect, in the first modification, radio waves are radiated from the respective antenna devices 22 at different times, and the circularly polarized waves radiated from the respective antenna devices 22 are received separately from one another. Intensity of a right-handed circular polarization component and intensity of a left-handed circular polarization component of the radio wave are measured for each antenna device 22. Moreover, a phase difference in the right-handed circular polarization component between the antenna devices 22 and a phase difference in the left-handed circular polarization component between the antenna devices 22 are measured.

Based on these measurement results, intensity of a right-handed circular polarization component and intensity of a left-handed circular polarization component in a composite wave of the radio waves radiated from the plurality of antenna devices 22 are calculated. In a case in which, at Step S04*a*, a certain antenna device 22 has already received the radio wave which is radiated under the same phase condition, the procedure of radiation and reception under the same phase condition is not required to be re-executed, and the measured information may be used.

Next, an optimal phase condition determination method according to a second modification of the first example is described.

In the first modification, each antenna device 22 actually radiates a radio wave, and the reception antenna receives the radiated radio wave. Thereby, the intensity of the right-handed circular polarization component and the intensity of the left-handed circular polarization component for each antenna device 22, and the phase difference in the right-handed circular polarization component and the phase difference in the left-handed circular polarization component between the antenna devices 22 are measured. In this respect, in the second modification, an electromagnetic field simulator is used to calculate a physical quantity for each antenna device 22. At Step S05*a*, the short-axis intensity of the composite wave is calculated based on the simulation result.

Similarly to the first example, also in these modifications of the first example, the optimal phase condition can be determined.

Next, an optimal phase condition determination method according to a third modification of the first example is described.

In the first example, at Step S04*a* (FIG. 4), the circularly-polarized-wave reception antenna for reception is operated as the reception antenna for a right-handed circularly polarized wave and a left-handed circularly polarized wave, and receives the composite wave. Then, the circularly-polarized-wave reception antenna acquires the right-handed circular polarization component and the left-handed circular polarization component. Other than the right-handed circular polarization component and the left-handed circular polarization component, two arbitrary polarization components which are linearly independent from one another may be received. One example of the linearly independent relationship includes an orthogonal relationship. On example of two polarization components which are linearly independent from but not orthogonal to one another includes a vertical polarization component and a left-handed circular polarization component. One example of the two polarization components orthogonal to one another includes, other than a left-handed circular polarization component and a right-handed circular polarization component, a vertical polarization component and a horizontal polarization component. For example, the vertical polarization component and the horizontal polarization component are received, and intensity and a phase difference of the two polarization components orthogonal to one another are acquired. Based on the intensity and phase difference of the two polarization components orthogonal to one another, a short-axis intensity of a composite wave can be obtained.

Also in the third modification of the first example, similarly to the first modification of the first example, radio waves may be radiated from the respective antenna devices 22 at different times, and two polarization components orthogonal to one another may be received for each antenna device 22. Moreover, similarly to the second modification of the first example, the intensity and phase difference of the two polarization components orthogonal to one another may be obtained through simulation.

Second Example

Next, a phase condition determination processing adopted in an optimal phase condition determination method according to a second example is described with reference to FIGS. 8 and 9. Description of a configuration in common with the optimal phase condition determination method according to the first example is omitted below.

Figure 8:
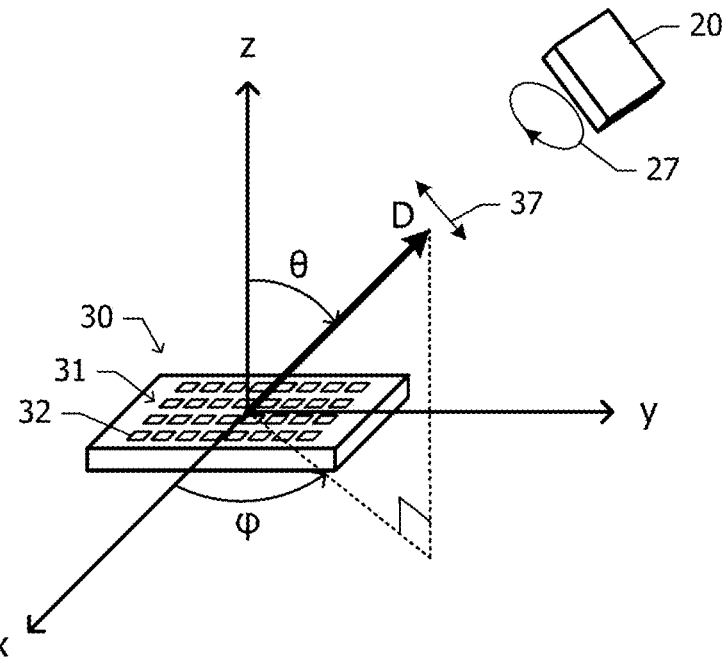
FIG. 8 is a schematic view illustrating a positional relationship between the first antenna module and the second antenna module and a definition of a coordinate system.

FIG. 8 is a schematic view illustrating a positional relationship between the first antenna module 20 and the second antenna module 30 and a definition of a coordinate system. In the first example (FIG. 1A), the optimal phase condition of the first array antenna 21 which radiates a circularly polarized wave is determined. In this respect, in the second example, an optimal phase condition of a second array antenna 31 which radiates a linearly polarized wave is determined. The second antenna module 30 is equipped with the second array antenna 31 including a plurality of antenna devices 32. An xyz orthogonal coordinate system is defined such that a boresight direction of the second array antenna 31 is a positive direction of a z-axis. A direction from the second array antenna 31 is defined by a polar angle θ and an azimuth φ.

In the second example, an optimal phase condition is determined in a case in which the linearly polarized wave 37 radiated from the second array antenna 31 is received by the first antenna module 20 which transmits and receives the circularly polarized wave 27.

Figure 9:
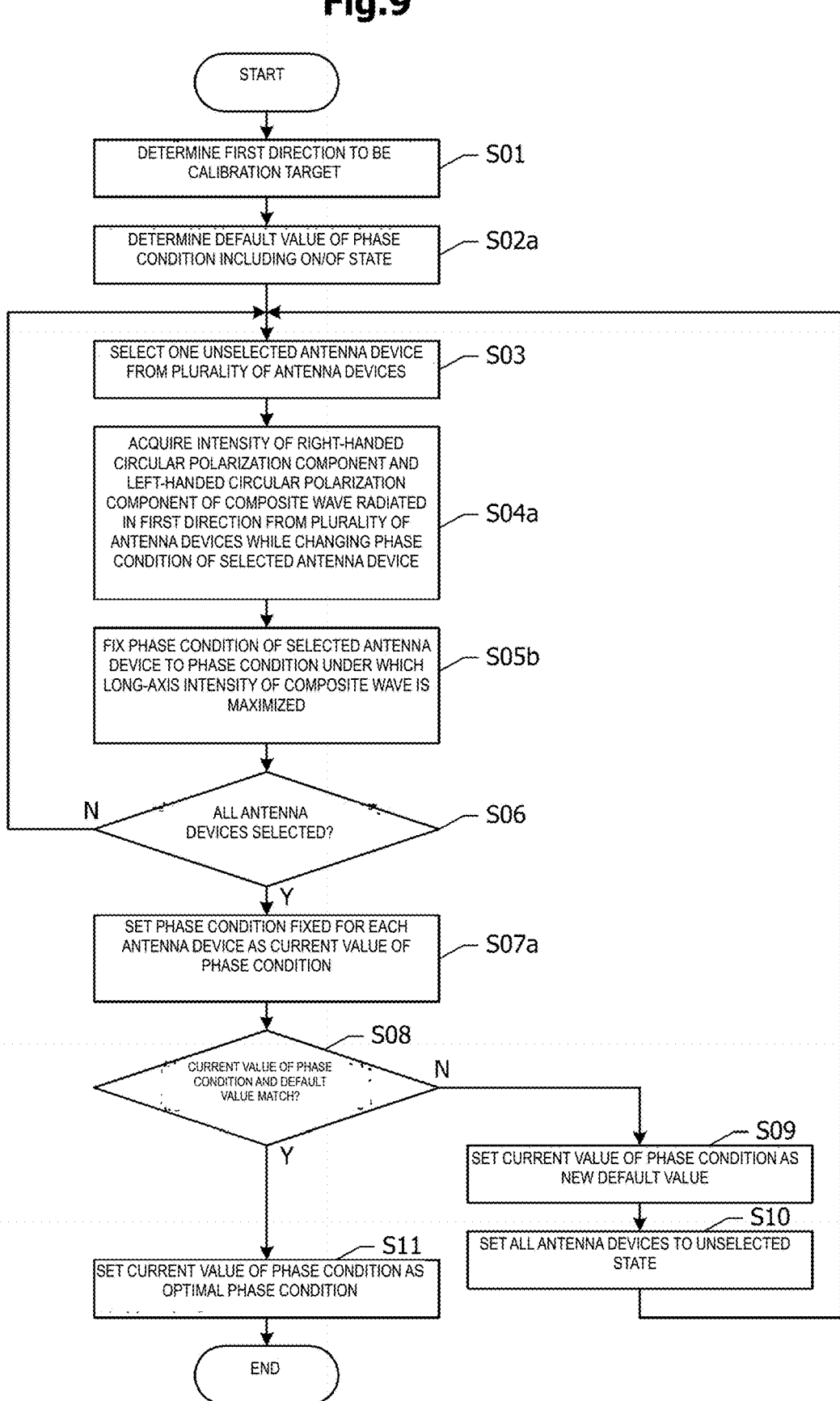
FIG. 9 is a flowchart presenting a procedure of a phase condition determination processing adopted in an optimal phase condition determination method according to a second example.

FIG. 9 is a flowchart presenting a procedure of the phase condition determination processing adopted in the optimal phase condition determination method according to the second example. Step S05*a* of the phase condition determination processing (FIG. 4) adopted in the method according to the first example is replaced by Step S05*b*. The other steps are the same as the corresponding steps in the phase condition determination processing (FIG. 4) adopted in the method according to the first example.

In the first example, the phase condition of the selected antenna device 22 is fixed in a manner such that the short-axis intensity of the composite wave becomes the maximum. In this respect, in the second example, a phase condition of a selected antenna device 32 is fixed in a manner such that a long-axis intensity of a composite wave becomes the maximum (Step S05*b*). The "long-axis intensity becomes the maximum" as used herein means becoming the largest among the plurality of evaluated phase conditions. The long-axis intensity may be larger under an unevaluated phase condition, for example, assuming the phase increment is smaller than 90°. Herein, "maximizing the long-axis intensity" means making the long-axis intensity largest among the plurality of evaluated phase conditions.

A long-axis intensity $A_{sum,mj}$ of the composite wave can be calculated by using the following equation substitute for Equation (4) described above.

[Math. 5]

$$A_{sum,mj} = \frac{A_{sum,R}\left[\sqrt{\text{mW}}\right] - A_{sum,L}\left[\sqrt{\text{mW}}\right]}{\sqrt{2}} \tag{5}$$

Next, a beneficial effect of the second example is described.

In the second example, a long-axis intensity of a polarized wave in a desired direction assuming seen from the second array antenna 31 is maximized. Assuming a short-axis intensity is sufficiently smaller than the long-axis intensity and a circularly-polarized-wave reception antenna receives the radio wave radiated from the second array antenna 31, a sufficient reception level can be secured regardless of a relationship between the polarization direction of the linearly polarized wave and a turning direction of the circularly-polarized-wave reception antenna.

Next, an optimal phase condition determination method according to a first modification of the second example is described.

In the second example, at Step S04a (FIG. 9), intensity of a right-handed circular polarization component and intensity of a left-handed circular polarization component are measured by the plurality of antenna devices 32 of the second array antenna 31 (FIG. 8) radiating linearly polarized waves and a composite wave thereof being received. In this respect, in the first modification, radio waves are radiated from the respective antenna devices 32 at different times, and linearly polarized waves radiated from the respective antenna devices 32 are received separately from one another. Intensity of a right-handed circular polarization component and intensity of a left-handed circular polarization component of the radio wave are measured for each antenna device 32. Moreover, a phase difference in the right-handed circular polarization component between the antenna devices 32 and a phase difference in the left-handed circular polarization component between the antenna devices 32 are measured.

Based on these measurement results, intensity of a right-handed circular polarization component and intensity of a left-handed circular polarization component in a composite wave of the radio waves radiated from the plurality of antenna devices 32 are calculated. In a case in which, at Step S04a, the radio wave which is radiated under the same phase condition has already been received, the procedure of radiation and reception under the same phase condition is not required to be re-executed, and the measured information may be used.

Next, an optimal phase condition determination method according to a second modification of the second example is described.

In the first modification, each antenna device 32 actually radiates a radio wave, and the reception antenna receives the radiated radio wave. Thereby, the intensity of the right-handed circular polarization component and the intensity of the left-handed circular polarization component for each antenna device 32, the phase difference in the right-handed circular polarization component between the antenna devices 32, and the phase difference in the left-handed circular polarization component between the antenna devices 32 are measured. In this respect, in the second modification, an electromagnetic field simulator is used to calculate a physical quantity for each antenna device 32.

Similarly to the second example, also in these modifications of the second example, the optimal phase condition can be determined.

Third Example

Next, a communication system according to a third example is described with reference to FIGS. 10 and 11. The communication system according to the third example performs communication by utilizing information similar to the optimal phase condition list 29 (FIG. 5) determined in the optimal phase condition determination method according to the first example or the second example.

Figure 10:
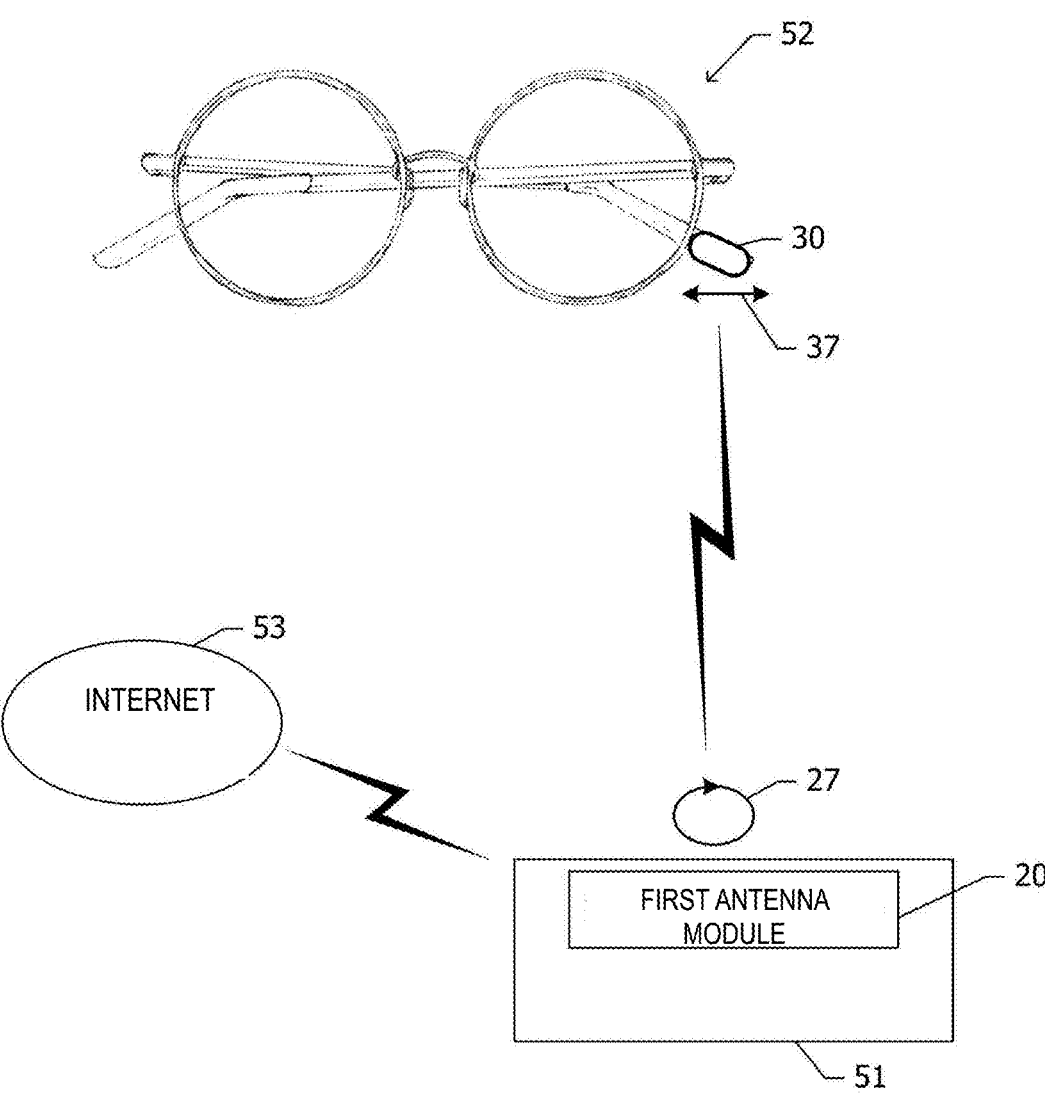
FIG. 10 is a schematic diagram of a communication system according to a third example.

FIG. 10 is a schematic diagram of the communication system according to the third example. The first antenna module 20 is equipped to a processing device 51, and the second antenna module 30 is equipped to augmented reality (AR) glasses 52. The first antenna module 20 transmits and receives the circularly polarized wave 27, and the second antenna module 30 transmits and receives the linearly polarized wave 37. The processing device 51 communicates with a variety of servers and the like via the internet 53. The processing device 51 is stored, for example, in a bag carried by a person wearing the AR glasses 52 or in a pocket of a clothing of the person.

Figure 11:
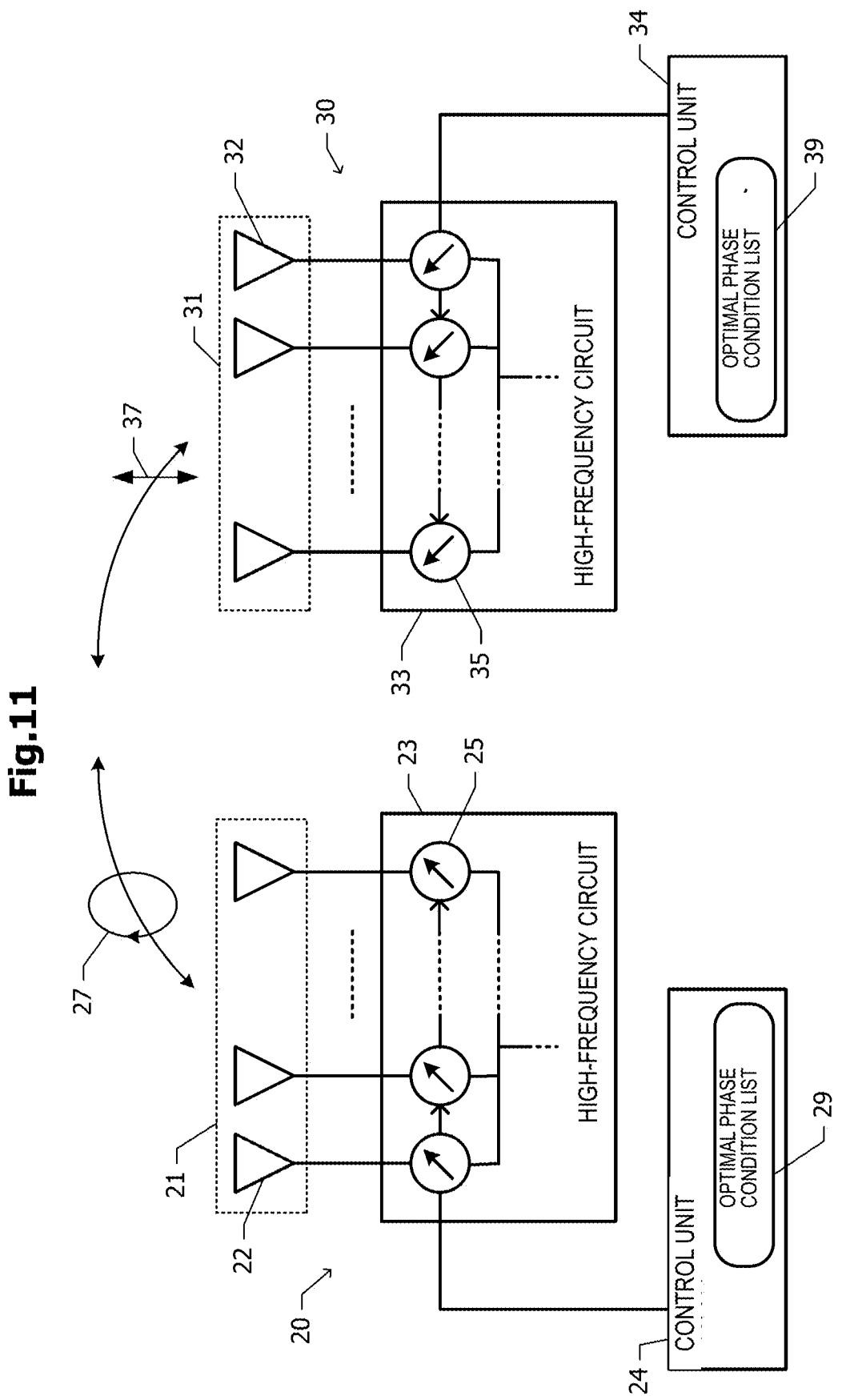
FIG. 11 is a block diagram of the communication system according to the third example.

FIG. 11 is a block diagram of the communication system according to the third example. The first antenna module 20 includes the first array antenna 21, a high-frequency circuit 23, and a control unit 24. The first array antenna 21 includes the plurality of antenna devices 22, and transmits and receives the circularly polarized wave 27. The high-frequency circuit 23 includes a plurality of phase shifters 25 connected to the respective antenna devices 22. Each phase shifter 25 changes a phase of a high-frequency signal supplied to the antenna device 22.

The control unit 24 stores the optimal phase condition list 29 (FIG. 5). The optimal phase condition list 29 is created in the optimal phase condition determination method (FIG. 4) according to the first example. The control unit 24 controls the phase shifter 25 with reference to the optimal phase condition list 29. At this time, based on a reception level of a radio wave received by the second antenna module 30 which is a counterpart of the communication, the control unit 24 selects one optimal phase condition from a plurality of optimal phase conditions included in the optimal phase condition list 29. For example, the optimal phase condition is selected so that the reception level by the second antenna module 30 is maximized. The control unit 24 controls the phase shifters 25 of the high-frequency circuit 23 based on the selected optimal phase condition.

Next, one example of a procedure to select, by the control unit 24, one optimal phase condition from the plurality of optimal phase conditions included in the optimal phase condition list 29 is described.

The control unit 24 of the first antenna module 20 selects one optimal phase condition from the optimal phase condition list 29, and controls the phase of the first array antenna 21 based on the selected optimal phase condition. Assuming the second antenna module 30 receives a radio wave from the first antenna module 20, the second antenna module 30 measures a reception intensity, and transmits the measurement value to the first antenna module 20. This procedure is repeated for all the optimal phase conditions stored in the optimal phase condition list 29.

The control unit 24 of the first antenna module 20 adopts an optimal phase condition under which the measurement value of the reception intensity, the measurement value being received from the second antenna module 30, becomes the highest. Assuming one optimal phase condition is adopted, the control unit 24 operates the high-frequency circuit 23 based on the adopted optimal phase condition to communicate with the second antenna module 30. In this method, the information included in the optimal phase condition list 29 (FIG. 5) and related to the direction is not used. Therefore, the optimal phase condition list 29 does not necessarily include the information related to the direction.

Note that in a case in which the direction where the communication counterpart is located is known, searching the optimal phase condition list 29 may be performed based on the direction of the communication counterpart, and an optimal phase condition associated with a direction closest to the direction where the communication counterpart is located may be adopted. In this case, the transmission and reception procedure to adopt one optimal phase condition from the optimal phase condition list 29 can be omitted.

Similarly, the second antenna module 30 includes the second array antenna 31, a high-frequency circuit 33, and a control unit 34. The second array antenna 31 includes the plurality of antenna devices 32, and transmits and receives the linearly polarized wave 37. The high-frequency circuit 33 includes a plurality of phase shifters 35 connected to the respective antenna devices 32. Each phase shifter 35 changes a phase of a high-frequency signal supplied to the antenna device 32.

The control unit 34 stores an optimal phase condition list 39. The optimal phase condition list 39 is created in the optimal phase condition determination method (FIG. 9) according to the second example. The control unit 34 controls the phase shifter 35 with reference to the optimal phase condition list 39. At this time, similarly to the control by the control unit 24 of the first antenna module 20, based on a reception level of a radio wave received by the first antenna module 20 which is a counterpart of the communication, the control unit 34 selects one optimal phase condition from a plurality of optimal phase conditions included in the optimal phase condition list 39.

A procedure to select, by the control unit 34 of the second antenna module 30, one optimal phase condition from the plurality of optimal phase conditions included in the optimal phase condition list 39 is the same as the procedure executed by the control unit 24 of the first antenna module 20.

Next, a beneficial effect of the third example is described.

The control unit 24 of the first antenna module 20 of the communication system according to the third example stores the optimal phase condition list 29 created in the method (FIG. 4) according to the first example. The control unit 34 of the second antenna module 30 stores the optimal phase condition list 39 created in the method (FIG. 9) according to the second example. By the first array antenna 21 and the second array antenna 31 being operated respectively using the optimal phase condition lists 29 and 39, decrease in a reception level of a radio wave can be suppressed, and stable communication is achievable.

Each example described above is merely illustration, and needless to say, partial replacement or combination of the configurations provided in the different examples is possible. Similar operation and effects achieved by similar configurations in the plurality of examples are not mentioned every time in each example. Moreover, the present disclosure is not limited to the above-described examples. For example, it is obvious for the person skilled in the art that various changes, improvement, combination, and the like are possible.

REFERENCE SIGNS LIST 20 first antenna module
21 first array antenna
22 antenna device
23 high-frequency circuit
24 control unit
25 phase shifter
27 circularly polarized wave
29 optimal phase condition list
30 second antenna module
31 second array antenna
32 antenna device
33 high-frequency circuit
34 control unit
35 phase shifter
37 linearly polarized wave
39 optimal phase condition list 51 processing device
52 augmented reality (AR) glass
53 internet

The invention claimed is:

1. A method of determining an optimal phase condition that is performed by an antenna device, the method comprising:

obtaining a short-axis intensity under a plurality of phase conditions including different phase conditions of a high-frequency signal supplied to a plurality of antenna devices included in an array antenna, the short-axis intensity being a maximum value of a short-axis direction component of an electric field vector of a composite wave of radio waves radiated in a first direction from the respective antenna devices; and determining an optimal phase condition of the high-frequency signal supplied to the plurality of antenna devices in a manner such that the short-axis intensity of the composite wave is maximized.

2. The method according to claim 1, wherein the array antenna transmits and receives a circularly polarized wave.

3. The method according to claim 2, wherein obtaining the short-axis intensity of the composite wave includes:

acquiring intensity of a right-handed circular polarization component and intensity of a left-handed circular polarization component of the composite wave; and obtaining the short-axis intensity of the composite wave based on the intensity of the right-handed circular polarization component and the intensity of the left-handed circular polarization component of the composite wave.

4. The method according to claim 3, wherein acquiring the intensity of the right-handed circular polarization component and the intensity of the left-handed circular polarization component of the composite wave includes:

transmitting radio waves from the plurality of antenna devices;

receiving, by a circularly-polarized-wave reception antenna, the right-handed circular polarization component and the left-handed circular polarization component of the composite wave of the radio waves transmitted in the first direction; and measuring the intensity of the right-handed circular polarization component and the intensity of the left-handed circular polarization component.

5. The method according to claim 3, wherein acquiring the intensity of the right-handed circular polarization component and the intensity of the left-handed circular polarization component of the composite wave includes:

acquiring, for each of the plurality of antenna devices, the intensity of the right-handed circular polarization component and the intensity of the left handed circular polarization component of the radio waves-transmitted from each of the plurality of antenna devices in the first-direction; and acquiring a phase-difference in the right handed circular polarization component and a phase difference in the left handed circular polarization component between the antenna devices acquiring, for each of the plurality of antenna devices, the intensity of the right-handed circular polarization component and the intensity of the left-handed circular polarization component of the radio waves

21 transmitted from each of the plurality of antenna devices in the first direction;

acquiring a phase difference in the right-handed circular polarization component and a phase difference in the left-handed circular polarization component between the antenna devices; and calculating the intensity of the right-handed circular polarization component and the intensity of the left-handed circular polarization component of the composite wave based on the acquired intensities and phase differences.

6. The method according to claim 1, wherein obtaining the short-axis intensity of the composite wave includes:

acquiring intensity of each of two polarization components of the composite wave and a phase difference between the two polarization components of the composite wave, the two polarization components being linearly independent from one another; and obtaining the short-axis intensity of the composite wave based on the intensity of each of the two polarization components of the composite wave and the phase difference between the two polarization components.

7. The method according to claim 6, wherein acquiring the intensity of each of the two polarization components of the composite wave and the phase difference between the two polarization components, the two polarization components being linearly independent from one another, includes:

transmitting radio waves from the plurality of antenna devices;

receiving, by a reception antenna, the two polarization components of the composite wave of the radio waves transmitted in the first direction, the two polarization components being linearly independent from one another; and measuring the intensity of each of the two polarization components of the composite wave that are linearly independent from one another and the phase difference between the two polarization components of the composite wave.

8. The method according to claim 6, wherein acquiring the intensity of each of the two polarization components of the composite wave and the phase difference between the two polarization components, the two polarization components being linearly independent from one another, includes:

acquiring, for each of the plurality of antenna devices, the intensity of each of the two polarization components of the radio wave transmitted from each of the plurality of antenna devices in the first direction, and a phase difference between the two polarization components of the radio wave, the two polarization components being linearly independent from one another; and acquiring a phase difference in the two polarization components between the antenna devices, the two polarization components being linearly independent from one another; and calculating the intensity of each of the two polarization components of the composite wave and the phase difference between the two polarization components of the composite wave based on the acquired intensities and phase differences, the two polarization components being linearly independent from one another.

9. The method according to claim 2, wherein obtaining the short-axis intensity of the composite wave includes:

acquiring intensity of each of two polarization components of the composite wave and a phase difference between the two polarization components, the two polarization components being linearly independent from one another; and obtaining the short-axis intensity of the composite wave based on the intensity of each of the two polarization components and the phase difference between the two polarization components.

10. The method according to claim 9, wherein acquiring the intensity of each of the two polarization components of the composite wave and the phase difference between the two polarization components, the two polarization components being linearly independent from one another, includes:

transmitting radio waves from the plurality of antenna devices;

receiving, by a reception antenna, the two polarization components of the composite wave of the radio waves transmitted in the first direction, the two polarization components being linearly independent from one another; and measuring the intensity of each of the two polarization components that are linearly independent from one another and the phase difference between the two polarization components.

11. The method according to claim 9, wherein acquiring the intensity of each of the two polarization components of the composite wave and the phase difference between the two polarization components, the two polarization components being linearly independent from one another, includes:

acquiring, for each of the plurality of antenna devices, intensity of each of the two polarization components of the radio wave transmitted from each of the plurality of antenna devices in the first direction, and a phase difference between the two polarization components of the radio wave, the two polarization components being linearly independent from one another;

acquiring a phase difference in the two polarization components between the antenna devices, the two polarization components being linearly independent from one another; and calculating the intensity of each of the two polarization components of the composite wave and the phase difference between the two polarization components of the composite wave based on the acquired intensities and phase differences, the two polarization components being linearly independent from one another.

12. A method of determining an optimal phase condition that is performed by an antenna device, the method comprising:

obtaining a long-axis intensity under a plurality of phase conditions including different phase conditions of a high-frequency signal supplied to a plurality of antenna devices included in an array antenna, the long-axis intensity being a maximum value of a long-axis direction component of an electric field vector of a composite wave of radio waves radiated in a first direction from the respective antenna devices; and determining an optimal phase condition of the high-frequency signal supplied to the plurality of antenna devices in a manner such that the long-axis intensity of the composite wave is maximized.

13. An antenna module comprising:

an array antenna including a plurality of antenna devices configured to transmit and receive a circularly polarized wave;

a high-frequency circuit configured to adjust phases between the antenna devices and supply a high-frequency signal to each of the plurality of antenna devices; and control circuitry storing an optimal phase condition list in which a phase condition of the high-frequency signal supplied to the plurality of antenna devices is associated with each of multiple directions seen from the array antenna, and configured to control, in accordance with a direction in which a radio wave is to be transmitted, the high-frequency circuit to operate under a phase condition associated with the direction, wherein the phase condition included in the optimal phase condition list is determined in a manner such that a short-axis intensity is maximized, the short-axis intensity being a maximum value of a short-axis direction component of an electric field vector of a composite wave of radio waves radiated in a direction associated with the phase condition from the plurality of antenna devices.

14. The antenna module according to claim 13, wherein the control circuitry selects, based on a reception level of a radio wave received by a counterpart of communication, one phase condition from a plurality of said phase conditions included in the optimal phase condition list, and controls the high-frequency circuit under the selected phase condition.

15. A communication system comprising:

the antenna module of claim 13, which is a first antenna module of the communication system; and a second antenna module configured to communicate with the first antenna module by transmitting and receiving a linearly polarized wave, wherein the second antenna module includes a corresponding antenna device configured to transmit and receive a linearly polarized wave, and assuming the second antenna module receives the composite wave from the first antenna module, the second antenna module transmits a measurement value of a reception intensity to the first antenna module, and the control circuitry of the first antenna module operates the high-frequency circuit of the first antenna module under a plurality of phase conditions, determines, as an optimal phase condition, a phase condition under which the measurement value of the reception intensity, the measurement value being received from the second antenna module, becomes a highest, and operates the high-frequency circuit of the first antenna module under the optimal phase condition to communicate with the second antenna module.

24

16. An antenna module comprising:

an array antenna including a plurality of antenna devices configured to transmit and receive a linearly polarized wave;

a high-frequency circuit configured to adjust phases between the antenna devices and supply a high-frequency signal to each of the plurality of antenna devices; and control circuitry storing an optimal phase condition list in which a phase condition of the high-frequency signal supplied to the plurality of antenna devices is associated with each of multiple directions seen from the array antenna, and configured to control, in accordance with a direction in which a radio wave is to be transmitted, the high- frequency circuit to operate under a phase condition associated with the direction, wherein the phase condition included in the optimal phase condition list is determined in a manner such that a long-axis intensity is maximized, the long-axis intensity being a maximum value of a long-axis direction component of an electric field vector of a composite wave of radio waves radiated in a direction associated with the phase condition from the plurality of antenna devices.

17. The antenna module according to claim 16, wherein the control circuitry selects, based on a reception level of a radio wave received by a counterpart of communication, one phase condition from a plurality of said phase conditions included in the optimal phase condition list, and controls the high-frequency circuit under the selected phase condition.

18. A communication system comprising:

a first antenna module configured to transmit and receive a circularly polarized wave; and the antenna module of claim 16, which is a second antenna module of the communication system and is configured to communicate with the first antenna module, wherein the first antenna module includes a corresponding antenna device configured to transmit and receive the circularly polarized wave, and assuming the first antenna module receives a radio wave from the second antenna module, the first antenna module transmits a measurement value of a reception intensity to the second antenna module, and the control circuitry of the second antenna module operates the high-frequency circuit of the second antenna module under a plurality of phase conditions, determines, as an optimal phase condition, a phase condition under which the measurement value of the reception intensity, the measurement value being received from the first antenna module, becomes a highest, and operates the high-frequency circuit of the second antenna module under the optimal phase condition to communicate with the first antenna module.

* * * * *